United States Patent
Mäder et al.

(10) Patent No.: US 7,423,088 B2
(45) Date of Patent: *Sep. 9, 2008

(54) β CRYSTALLINE POLYPROPYLENES

(75) Inventors: Dietmar Mäder, Freiburg (DE); Kurt Hoffmann, Weitenau-Steinen (DE); Hans-Werner Schmidt, Bayreuth (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 399 days.

This patent is subject to a terminal disclaimer.

(21) Appl. No.: 10/515,900

(22) PCT Filed: May 22, 2003

(86) PCT No.: PCT/EP03/05374

§ 371 (c)(1),
(2), (4) Date: May 9, 2005

(87) PCT Pub. No.: WO03/102069

PCT Pub. Date: Dec. 11, 2003

(65) Prior Publication Data

US 2005/0203226 A1 Sep. 15, 2005

(30) Foreign Application Priority Data

May 30, 2002 (EP) .................. 02405428

(51) Int. Cl.
*C08F 8/00* (2006.01)
(52) U.S. Cl. ...................... 525/193; 525/194
(58) Field of Classification Search ............... 525/193, 525/194
See application file for complete search history.

(56) References Cited

U.S. PATENT DOCUMENTS

| | | | | |
|---|---|---|---|---|
| 6,235,823 | B1 | 5/2001 | Ikeda et al. | 524/229 |
| 7,235,191 | B2 * | 6/2007 | Schmidt et al. | 252/401 |
| 2004/0063830 | A1 | 4/2004 | Schmidt et al. | 524/191 |

* cited by examiner

*Primary Examiner*—Nathan M Nutter
(74) *Attorney, Agent, or Firm*—Joseph C. Suhadolnik

(57) ABSTRACT

A composition containing (1) a crystalline polypropylene resin and (2) one or more β-nucleating agents of the formula (I), wherein $R_1$, $R_2$ and $R_3$, independently of one another, are $C_1$-$C_{20}$alkyl, $C_2$-$C$alkyl substituted by $C_1$-$C_{10}$alkylamino, di($C_1$-$C_{10}$alkyl)amino, $C_1$-$C_{10}$alkyloxy or hydroxy; $C_3$-$C_{20}$alkenyl, $C_5$-$C_{12}$cycloalkyl, $C_5$-$C_{12}$Cycloalkyl substituted by 1, 2 or 3 $C_1$-$C_{10}$alkyl; cyclohexylmethyl; cyclohexylmethyl substituted by 1, 2 or 3 $C_1$-$C_{10}$alkyl; $C_5$-$C_9$cycloalkenyl, $C_5$-$C_9$cycloalkenyl substituted by 1, 2 or 3 $C_1$-$C_{10}$alkyl; phenyl substituted by 1, 2 or 3 radicals selected from the group consisting of $C_1$-$C_{10}$-oalkyl, $C_1$-$C_{10}$alkyloxy, hydroxy, halogen, trihalogenmethyl, trihalogenmethoxy, benzoyl, phenylamino, acylamino and phenylazo; $C_7$-$C_9$phenylalkyl, $C_7$-$C_9$phenylalkyl which is substituted on the phenyl by 1, 2 or 3 radicals selected from the group consisting of $C_1$-$C_{10}$alkyl, $C_1$-$C_{10}$alkoxy and hydroxy; naphthyl, naphthyl substituted by $C_1C_{10}$alkyl, adamantyl, or a 5 to 6 membered heterocyclic group; characterized in that the polypropylene resin has a content of β-form crystals of at least 10% calculated by means of the following equation β-form crystal content (%)=$100 \times P_{\beta 1}/(P_{a1}+P_{a2}+P_{a3}+P_{\beta 1})$ where $P_{a1}$ to $P_{a3}$ are respective peak heights (maxima) of the a-form and $P_{\beta 1}$ is a peak height (maximum) of the β-form determined by wide angle X-ray scattering.

(I)

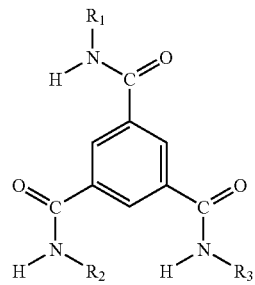

24 Claims, No Drawings

β CRYSTALLINE POLYPROPYLENES

The present invention relates to a composition containing a crystalline polypropylene resin and one or more specific trimesic acid derivatives capable of acting as a nucleating agent for the formation of the β-crystal form, to the use of these derivatives as β-nucleating agents and to articles made from a polypropylene resin containing the β-form crystals.

It is known that crystalline polypropylene may occur in α, β, γ and δ crystal forms as well as in the smectic crystal form which is formed on quenching of melted polypropylene. The β-crystal form (hereinafter referred to as "β-form") differs from the more common α-form which is found, for instance, in the conventional natural pellets in that it is lower in melting point and in density, not to speak of differences in the mode of crystallization and of fracture, thus being of interest from application points of view.

The β-form of polypropylene is less stable compared with the corresponding α-form under usual processing conditions. When melts of polypropylene are extruded and then cooled the α-form of polypropylene tends to predominate. However, polypropylene containing high contents of the β-form can be prepared by the addition of a suitable nucleating agent which induces the formation of the β-form when the polypropylene is molten and subsequently cooled.

U.S. Pat. No. 6,235,823 describes the use of diamide compounds as β-nucleating agents. EP-A-940,431 and JP-A-Hei 06/192,496 disclose the use of several trimesic acid derivatives as nucleating agents in general, however, without differentiating between the several crystal forms. Not any nucleating agent for polypropylene resins does necessarily induce the formation of the β-crystal form.

EP-A-865,914 and EP-A-865,911 describe polyolefin films. Polybutene-1 resin compositions are disclosed in EP-A-776,933, and porous stretched articles of polypropylene based resin are described in EP-A-632,095.

The present invention relates in particular to a composition containing
(1) a crystalline polypropylene resin and
(2) one or more β-nucleating agents of the formula (I),

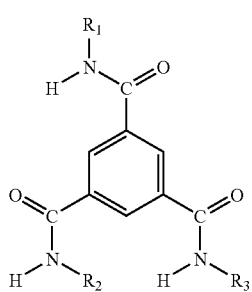

wherein
$R_1$, $R_2$ and $R_3$, independently of one another, are
$C_1$-$C_{20}$alkyl,
$C_2$-$C_{20}$alkyl substituted by $C_1$-$C_{10}$alkylamino, di($C_1$-$C_{10}$alkyl)amino, $C_1$-$C_{10}$alkyloxy or hydroxy;
$C_3$-$C_{20}$alkenyl,
$C_5$-$C_{12}$cycloalkyl,
$C_5$-$C_{12}$cycloalkyl substituted by 1, 2 or 3 $C_1$-$C_{10}$alkyl;
cyclohexylmethyl;
cyclohexylmethyl substituted by 1, 2 or 3 $C_1$-$C_{10}$alkyl;
$C_5$-$C_9$cycloalkenyl,
$C_5$-$C_9$cycloalkenyl substituted by 1, 2 or 3 $C_1$-$C_{10}$alkyl;
phenyl substituted by 1, 2 or 3 radicals selected from the group consisting of $C_1$-$C_{10}$alkyl,
$C_1$-$C_{10}$alkyloxy, hydroxy, halogen, trihalogenmethyl, trihalogenmethoxy, benzoyl,
phenylamino, acylamino and phenylazo;
$C_7$-$C_9$phenylalkyl,
$C_7$-$C_9$phenylalkyl which is substituted on the phenyl by 1, 2 or 3 radicals selected from the group consisting of $C_1$-$C_{10}$alkyl, $C_1$-$C_{10}$alkoxy and hydroxy;
naphthyl,
naphthyl substituted by $C_1$-$C_{10}$alkyl;
adamantyl, or
a 5 to 6 membered heterocyclic group;

characterized in that the polypropylene resin has a content of β-form crystals of at least 10%, for example at least 20% or 30% or 40% or 50% or 60% or 70% or 80% or 90% or 95%, calculated by means of the following equation β-form crystal content (%)=100×$P_{β1}$/($P_{α1}$+$P_{α2}$+$P_{α3}$+$P_{β1}$)

where $P_{α1}$ to $P_{α3}$ are respective peak heights (maxima) of the α-form and $P_{β1}$ is a peak height (maximum) of the β-form determined by wide angle X-ray scattering.

$P_{β1}$ is a reflection intensity (height) on (300) plane of β-form crystal.

$P_{α1}$ is a reflection intensity (height) on (110) plane of α-form crystal.

$P_{α2}$ is a reflection intensity (height) on (040) plane of α-form crystal.

$P_{α3}$ is a reflection intensity (height) on (130) plane of α-form crystal.

The β-form crystal content may be determined as described by A. Turner Jones et al. in Makromol. Chem. 75, 134 (1964) or as described in U.S. Pat. No. 5,491,188.

In the crystalline polypropylene resin, 10% or more of β-form crystal content determined by wide angle X-ray scattering has to be found in at least one direction.

A preferred embodiment of the present invention relates to a composition wherein the β-form crystals of component (1) are solidified and/or annealed at ambient temperature or at temperatures ($T_s$)

$T_s \leq T_{cr}+35°$ C.

$T_{cr}$ being the recrystallization temperature of the polypropylene resin (component (1)) without a β-nucleating agent as determined by differential scanning calorimetry (DSC) by cooling the molten polypropylene resin at a cooling rate of 10 K/min.

Examples of suitable solidifying and/or annealing temperatures $T_s$ are:
($T_{cr}$ minus 120° C.) to ($T_{cr}$ plus 35° C.)
($T_{cr}$ minus 100° C.) to ($T_{cr}$ plus 35° C.)
($T_{cr}$ minus 80° C.) to ($T_{cr}$ plus 35° C.)
($T_{cr}$ minus 60° C.) to ($T_{cr}$ plus 35° C.)
($T_{cr}$ minus 40° C.) to ($T_{cr}$ plus 35° C.)
($T_{cr}$ minus 20° C.) to ($T_{cr}$ plus 35° C.)
$T_{cr}$ to ($T_{cr}$ plus 35° C.)
($T_{cr}$ minus 150° C.) to ($T_{cr}$ minus 100° C.)
($T_{cr}$ minus 120° C.) to ($T_{cr}$ minus 80° C.)
($T_{cr}$ minus 120° C.) to ($T_{cr}$ minus 60° C.)
($T_{cr}$ minus 120° C.) to ($T_{cr}$ minus 40° C.)
($T_{cr}$ minus 120° C.) to ($T_{cr}$ minus 20° C.)
($T_{cr}$ minus 120° C.) to $T_{cr}$.
($T_{cr}$ minus 90° C.) to ($T_{cr}$ minus 80° C.)
($T_{cr}$ minus 90° C.) to ($T_{cr}$ minus 60° C.)
($T_{cr}$ minus 90° C.) to ($T_{cr}$ minus 40° C.)

($T_{cr}$ minus 90° C.) to ($T_{cr}$ minus 20° C.)
($T_{cr}$ minus 90° C.) to $T_{cr}$ The following solidifying and/or annealing temperatures T are preferred:
($T_{cr}$ minus 80° C.) to ($T_{cr}$ minus 60° C.)
($T_{cr}$ minus 80° C.) to ($T_{cr}$ minus 40° C.)
($T_{cr}$ minus 80° C.) to ($T_{cr}$ minus 20° C.)

The following solidifying and/or annealing temperatures T are particularly preferred:
($T_{cr}$ minus 120° C.) to ($T_{cr}$ minus 100° C.)
($T_{cr}$ minus 110° C.) to ($T_{cr}$ minus 80° C.)
($T_{cr}$ minus 110° C.) to ($T_{cr}$ minus 90° C.)
($T_{cr}$ minus 80° C.) to ($T_{cr}$ minus 60° C.)
($T_{cr}$ minus 40° C.) to ($T_{cr}$ minus 20° C.)
($T_{cr}$ minus 60° C.) to ($T_{cr}$ minus 40° C.)
($T_{cr}$ minus 20° C.) to ($T_{cr}$ plus 10° C.)
$T_{cr}$ to ($T_{cr}$ plus 35° C.)
$T_{cr}$ Also of interest are:
($T_{cr}$ minus 70° C.) to ($T_{cr}$ plus 20° C.)
($T_{cr}$ minus 60° C.) to ($T_{cr}$ plus 10° C.)

Examples of $C_1$-$C_{20}$alkyl are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methyl-hexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methyl-undecyl, dodecyl, 1,1,3,3,5,5-hexamethylhexyl, tridecyl, tetradecyl, pentadecyl, hexadecyl, heptadecyl, octadecyl and eicosyl.

Preferred examples are butyl, octyl and octadecyl.

Examples of $C_2$-$C_{20}$alkyl substituted by $C_1$-$C_{10}$alkylamino, di($C_1$-$C_{10}$alkyl)amino, $C_1$-$C_{10}$alkyloxy or hydroxy are 3-methylaminopropyl, 2-dimethylaminoethyl, 2-diethylaminoethyl, 3-dimethylaminopropyl, 3-diethylaminopropyl, 2-methoxyethyl, 2-ethoxyethyl, 2-methoxypropyl, 3-methoxypropyl, 2-ethoxypropyl, 3-isopropoxypropyl and hydroxyethyl.

Preferred examples are 3-dimethylaminopropyl, 3-methoxypropyl and 2-methoxyethyl.

Examples of $C_3$-$C_{20}$alkenyl are allyl, 2-methallyl, butenyl, pentenyl, hexenyl and oleyl. The carbon atom in position 1 is preferably saturated. Particularly preferred examples are allyl and oleyl.

Examples of $C_5$-$C_{12}$cycloalkyl are cyclopentyl, cyclohexyl, cycloheptyl, cyclooctyl and cyclododecyl.

Preferred examples are cyclohexyl, cycloheptyl, cyclooctyl and cyclododecyl.

Preferred examples of $C_5$-$C_{12}$cycloalkyl substituted by 1, 2 or 3 $C_1$-$C_{10}$alkyl are 3-methylcyclohexyl and 2,3-dimethylcyclohexyl.

An example of cyclohexylmethyl substituted by 1, 2 or 3 $C_1$-$C_{10}$alkyl is 1-cyclohexylethyl.

An example of $C_5$-$C_9$cycloalkenyl is cyclohexenyl.

An example of $C_5$-$C_9$cycloalkenyl substituted by 1, 2 or 3 $C_1$-$C_{10}$alkyl is methylcyclohexenyl.

Examples of phenyl substituted by 1, 2 or 3 radicals selected from the group consisting of $C_1$-$C_{10}$alkyl, $C_1$-$C_{10}$alkyloxy, hydroxy, halogen, trihalogenmethyl, trihalogenmethoxy, benzoyl, phenylamino, acylamino and phenylazo are 4-methylphenyl, 2-ethylphenyl, 4-ethylphenyl, 4-isopropylphenyl, 4-tert-butylphenyl, 4-sec-butylphenyl, 4-isobutylphenyl, 3,5-dimethylphenyl, 3,4-dimethylphenyl, 2,4-dimethylphenyl, 2,6-diethylphenyl, 2-ethyl-6-methylphenyl, 2,6-diisopropylphenyl, 4-methoxyphenyl, 4-ethoxyphenyl, 4-hydroxyphenyl, 4-fluorophenyl, 3,5-difluorophenyl, 2-chlorophenyl, 3-chlorophenyl, 3-chloro-6-methylphenyl, 3,5-di(trifluoromethyl)phenyl, 4-trifluoromethoxyphenyl, 2-benzoylphenyl, 4-phenylaminophenyl, 4-acetamidophenyl and 4-(phenylazo)phenyl.

A preferred example is 3,4-Dimethylphenyl.

Examples of $C_7$-$C_9$phenylalkyl are benzyl and 2-phenylethyl. Benzyl is preferred.

Examples of $C_7$-$C_9$phenylalkyl which is substituted on the phenyl by 1, 2 or 3 radicals selected from the group consisting of $C_1$-$C_{10}$alkyl, $C_1$-$C_{10}$alkoxy and hydroxy are methylbenzyl, dimethylbenzyl, trimethylbenzyl, tert-butylbenzyl, methoxybenzyl and 3,5-di-tert-butyl-4-hydroxybenzyl.

An example of naphthyl substituted by $C_1$-$C_{10}$alkyl is methylnaphthyl.

Examples of a 5 to 6 membered heterocyclic group are 2-picolyl, (2-furyl)methyl, (2-tetrahydrofuryl)methyl, 2-pyrimidyl, 6-methyl-2-pyridyl, 1,2,4-triazol-3-yl and 2-(1-piperazinyl)ethyl.

The polypropylene resin of component (1) has preferably a content of Pβ-form crystals of 10 to 98%, in particular 15 to 80%.

Further examples of a suitable content of the β-form crystals are, depending on the desired application of the polypropylene resin, 10 to 95%, 10 to 90%, 10 to 85%, 10 to 80%, 10 to 75%, 10to 70%, 10to 65%, 10to 60%, 10to 55%, 10to 50%, 10to 45%, 10to 40%, 10to 35%, 10to 30%, 20 to 95%, 20to 90%, 20 to 85%,.20 to 80%, 20to 75%, 20 to 70%, 20 to 65%, 20 to 60%, 20 to 55%, 20 to 50%, 20 to 45%, 20 to 40%, 20 to 35%, 20 to 30%, 30to 95%, 30to 90%, 30to 85%, 30to 80%, 30to 75%, 30to 70%, 30to 65%, 30 to 60%, 30 to 55%, 30 to 50%, 30 to 45%, 30 to 40%, 35 to 95%, 35 to 90%, 35 to 85%, 35 to 80%, 35 to 75%, 35 to 70%, 35 to 65%, 35 to 60%, 35 to 55%, 35 to 50%, 35 to 45%, 40 to 95%, 40 to 90%, 40 to 85%, 40 to 80%, 40 to 75%, 40 to 70%, 40 to 65%, 40 to 60%, 40 to 55%, 40 to 50%, 45 to 95%, 45 to 90%, 45 to 85%, 45 to 80%, 45 to 75%, 45to 70%, 45to 65%, 45to 60%, 45to 55, 50to 95%, 50to 90%, 50to 85%, 50to 80%, 50to 75%, 50to 70%, 50to 65%, 50to 60%, 55to 90%, 55to 85%, 55to 80%, 55to 75%, 55to 70%, 55to 65%, 60to 95%, 60to 90%, 60to 85%, 60to 80%, 60to 75%, 60 to 70%, 65 to 95%, 65 to 90%, 65 to 85%, 65 to 80%, 70 to 95%, 70 to 90%, 70 to 85% and 70to 80%.

According to a preferred embodiment of the present invention, the polypropylene resin has a haze which is greater than 62%, in particular greater than 70% or 80%; the haze value being measured at a plate, preferably prepared by injection molding, of 1.1 -1.2 mm thickness. The haze value in a range from 65 to 99%, in particular 70 to 99%, 75 to 99% or 80 to 99% is particularly preferred.

The haze is determined according to ASTM D 1003. Haze is defined as that percentage transmitted light which in passing through a specimen (plate) deviates from the incident beam by more than 2.5° on the average. Clarity is evaluated in the angle range smaller than 2.5°. The specimen shall have substantially plane-parallel surfaces free of dust, grease, scratches, and blemishes, and it shall be free of distinct internal voids and particles.

According to a preferred embodiment of the present invention component (1) is a polypropylene homopolymer.

Polypropylene homopolymer also covers long chain branched polypropylene.

Polypropylene, can be prepared by different methods. Examples are described in the following:

Catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

According to a further preferred embodiment of the present invention, component (1) is a polypropylene random copolymer, alternating or segmented copolymer or block copolymer containing one or more comonomers selected from the group consisting of ethylene, $C_4$-$C_{20}$-α-olefin, vinylcyclohexane, vinylcyclohexene, $C_4$-$C_{20}$alkandiene, $C_5$-$C_{12}$cycloalkandiene and norbornene derivatives; the total amount of propylene and the comonomer(s) being 100%.

Polypropylene copolymer also covers long chain branched polypropylene copolymer.

Examples of suitable $C_4$-$C_{20}$α-olefins are 1-butene, 1-pentene, 1-hexene, 1-heptene, 1-octene, 1-nonene, 1-decene, 1-undecene, 1-dodecene, 1-tetradecene, 1-hexadecene, 1-octadecene, 1-eicosene and 4-methyl-1-pentene.

Examples of suitable $C_4$-$C_{20}$alkandienes are hexadiene and octadiene.

Examples of suitable $C_5$-$C_{12}$cycloalkandienes are cyclopentadiene, cyclohexadiene and cyclooctadiene.

Examples of suitable norbornene derivatives are 5-ethylidene-2-norbornene (ENB), dicyclopentadiene (DCP) and methylene-domethylene-hexahydronaphthaline (MEN).

A propylene/ethylene copolymer contains for example 50 to 99.9%, preferably 80 to 99.9%, in particular 90 to 99.9%, by weight of propylene.

A propylene copolymer wherein the comonomer is a $C_9$-$C_{20}$α-olefin such as e.g. 1-nonene, 1-decene, 1-undecene, 1-dodecene, 1-tetradecene, 1-hexadecene, 1-octadecene or 1-eicosene; $C_9$-$C_{20}$alkandiene, $C_9$-$C_{12}$cycloalkandiene or a norbornene derivative such as e.g. 5-ethylidene-2-norbornene (ENB) or methylene-domethylene-hexahydronaphthaline (MEN) contains preferably more than 90mol %, in particular 90 to 99.9mol % or 90 to 99mol %, of propylene.

A propylene copolymer wherein the comonomer is a $C_4$-$C_8$α-olefin such as e.g. 1-butene, 1-pentene, 1-hexene, 1-heptene, 1-octene or 4-methyl-1-pentene; vinylcyclohexane, vinylcyclohexene, $C_4$-$C_8$alkandiene or $C_5$-$C_8$cycloalkandiene contains preferably more than 80mol %, in particular 80 to 99.9mol % or 80 to 99mol %, of propylene.

Further examples of component (1) are propylene/isobutylene copolymer, propylene/butadiene copolymer, propylene/cycloolefin copolymer, terpolymers of propylene with ethylene and a diene such as hexadiene, dicyclopentadiene or ethylidene-norbornene; propylene/1-olefin copolymers where the 1-olefin is generated in situ; and propylene/carbon monoxide copolymers.

According to another preferred embodiment of the present invention component (1) is a thermoplastic polyolefin (TPO).

Thermoplastic polyolefin (TPO) means in particular elastomers that exhibit rubber characteristics and are based on polyolefins. These are preferably copolymers from ethylene and propylene (EPM) or terpolymers comprising ethylene, propylene and a non-conjugated diene (EPDM) and the like.

The present invention also relates to a composition which additionally contains (3) a further polymer, in particular a synthetic polymer, preferably EPDM or EPM; with the proviso that component (3) is different from component (1).

Examples of suitable polymers are

1. Polymers of monoolefins and diolefins, for example polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EM), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.
19. Polycarbonates and polyester carbonates.
20. Polyketones.
21. Polysulfones, polyether sulfones and polyether ketones.
22. Crosslinked polymers derived from aldehydes on the one hand and phenols, ureas and melamines on the other hand, such as phenol/formaldehyde resins, urea/formaldehyde resins and melamine/formaldehyde resins.
23. Drying and non-drying alkyd resins.
24. Unsaturated polyester resins derived from copolyesters of saturated and unsaturated dicarboxylic acids with polyhydric alcohols and vinyl compounds as crosslinking agents, and also halogen-containing modifications thereof of low flammability.
25. Crosslinkable acrylic resins derived from substituted acrylates, for example epoxy acrylates, urethane acrylates or polyester acrylates.
26. Alkyd resins, polyester resins and acrylate resins crosslinked with melamine resins, urea resins, isocyanates, isocyanurates, polyisocyanates or epoxy resins.
27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.
28. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.
29. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.
30. Aqueous emulsions of natural or synthetic rubber, e.g. natural latex or latices of carboxylated styrene/butadiene copolymers.

Preferred examples of a blend of components (1) and (3) are blends of polypropylene with propylene/ethylene copolymers, propylene/butylene copolymers, polyethylene, e.g. HDPE or LDPE; polybutene, polyisobutylene, poly-4-methylpentene or alternating or random polyalkylene/carbon monoxide copolymers.

According to a preferred embodiment of the present invention,
$R_1$, $R_2$ and $R_3$, independently of one another, are
$C_1$-$C_{20}$alkyl,
$C_2$-$C_{10}$alkyl substituted by $C_1$-$C_4$alkylamino, di($C_1$-$C_4$alkyl) amino, $C_1$-$C_4$alkyloxy or hydroxy;
$C_3$-$C_{20}$alkenyl,
$C_5$-$C_{12}$cycloalkyl,
$C_5$-$C_{12}$cycloalkyl substituted by 1, 2 or 3 $C_1$-$C_4$alkyl;
cyclohexylmethyl;
cyclohexylmethyl substituted by 1, 2 or 3 $C_1$-$C_4$alkyl;
phenyl substituted by 1, 2 or 3 radicals selected from the group consisting of $C_1$-$C_4$alkyl,
$C_1$-$C_4$alkyloxy or hydroxy;
benzyl,
benzyl which is substituted on the phenyl by 1, 2 or 3 radicals selected from the group consisting of $C_1$-$C_4$alkyl, $C_1$-$C_4$alkoxy and hydroxy;
naphthyl, or
naphthyl substituted by $C_1$-$C_4$alkyl.

According to a further preferred embodiment of the present invention
$R_1$, $R_2$ and $R_3$, independently of one another, are
$C_1$-$C_{20}$alkyl,
$C_2$-$C_6$alkyl substituted by $C_1$-$C_4$alkylamino, di($C_1$-$C_4$alkyl) amino or $C_1$-$C_4$alkyloxy;
$C_5$-$C_{12}$cycloalkyl,
$C_5$-$C_{12}$cycloalkyl substituted by 1, 2 or 3 $C_1$-$C_4$alkyl;
cyclohexylmethyl;
cyclohexylmethyl substituted by 1, 2 or 3 $C_1$-$C_4$alkyl;
phenyl substituted by 1, 2 or 3 $C_1$-$C_4$alkyl;
benzyl,
benzyl which is substituted on the phenyl by 1, 2 or 3 $C_1$-$C_4$alkyl; or
naphthyl.

According to a particularly preferred embodiment of the present invention
$R_1$, $R_2$ and $R_3$, independently of one another, are
butyl, octyl or octadecyl,
3-dimethylaminopropyl, 3-methoxypropyl or 2-methoxyethyl,
cyclohexyl, cycloheptyl, cyclooctyl or cyclododecyl,
3-methylcyclohexyl or 2,3-dimethylcyclohexyl,
1-cyclohexylethyl,
3,4-dimethylphenyl,
benzyl, or
naphthyl.
$R_1$, $R_2$ and $R_3$ are preferably identical and are preferably 2,3-dimethylcyclohexyl, tert-octyl or cyclooctyl.

The amount of the β-nucleating agent (component (2)) to be added to the polypropylene resin is not critical insofar as the desired effect can be obtained. Generally, it is used in an amount effective for increasing the content of the β-crystal form. 0.0001 to 5%, in particular 0.001 to 2%, 0.05 to 1%, 0.1 to 1% or 0.15 to 1%, relative to the weight of component (1), are suitable.

Thus, the β-nucleating agent of the invention is capable of causing a crystalline polypropylene resin to undergo transition to the β-crystal form at a very low level of addition and a molded product having a β-form crystal content as indicated above can be obtained under suitable molding conditions.

Component (3) is preferably present in the composition according to the present invention in an amount of 1 to 90%, for example 2 to 80% or 5 to 50%, relative to the weight of component (1).

A further embodiment of the present invention is a method for providing a polypropylene resin with a content of β-form crystals of at least 10% calculated by means of the following equation $$\beta\text{-form crystal content }(\%)=100\times P_{\beta 1}/(P_{\alpha 1}+P_{\alpha 2}+P_{\alpha 3}+P_{\beta 1})$$

where $P_{\alpha 1}$ to $P_{\alpha 3}$ are respective peak heights (maxima) of the β-form and $P_{\beta 1}$ is a peak height (maximum) of the β-form determined by wide angle X-ray scattering, which comprises incorporating into the polypropylene resin one or more β-nucleating agents of the formula (I).

Another embodiment of the present invention is the use of a compound of the formula (I) as β-nucleating agent for a polypropylene resin.

The resin compositions of the present invention may be prepared by standard procedures, well known to those skilled in the art, of compounding, such as mixing the prescribed components in a conventional mixer by e.g. dry-blending or solution spraying and melting and kneading the mixture with a single- or twin-screw extruder, or the like.

The β-nucleating agent of the formula (I) can be added to the polypropylene resin at an optional stage, i.e. either during the polymerization reaction or after the polymer has been prepared.

To the resin compositions of the present invention, additional materials can be added in a concentration range that does not adversely affect the beneficial effects of the invention. These materials may include stabilizers, antioxidants, antibacterial agents, ultraviolet absorbers, thermostabilizers, light stabilizers, neutralizers, antistatic agents, antiblocking agents, heavy metal inactivation agents, flame retardants, lubricants, peroxides, hydrotalcite, foaming agents, elastomers, processing aids, additional nucleating agents, reinforcing matter, plasticizer and the like and mixtures thereof.

More detailed examples of these conventional additives are listed below.

1. Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctyl-thiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxy-phenol, 2,5-di-tert-butylhydroquinone, 2,5-di-tert-amylhydroquinone, 2,6-diphenyl-4-octade-cyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl) adipate.

1.4. Tocorsherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butyl-phenol), 2,2'-ethylidenebis(6-tert-butyl-4-isobutylphenol), 2,2'-methylenebis [6-(α-methylbenzyl)-4-nonylphenol], 2,2'-methylenebis[6-(α,α-dimethylbenzyl)-4-nonylphenol], 4,4'-methylenebis(2, 6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy2-methylphenyl)-4-n-dodecylmercaptobutane, 1,1, 5,5-tetra(5-tert-butyl-4-hydroxy-2-methylphenyl)pentane.

1.7. O-, N- and S-benzyl compounds, for example 3,5,3', 5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5di-tert-butyl-4-hydroxy-benzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3, 5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4, 6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)protionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.16. Esters of 3.5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyidiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino] ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilisers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl) phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonyl-ethyl)phenyl) benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)phenyl] benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenol]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosohites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:
Tris(2,4-di-tert-butylphenyl)phosphite (Irgafos®168, Ciba-Geigy), tris(nonylphenyl)phosphite,

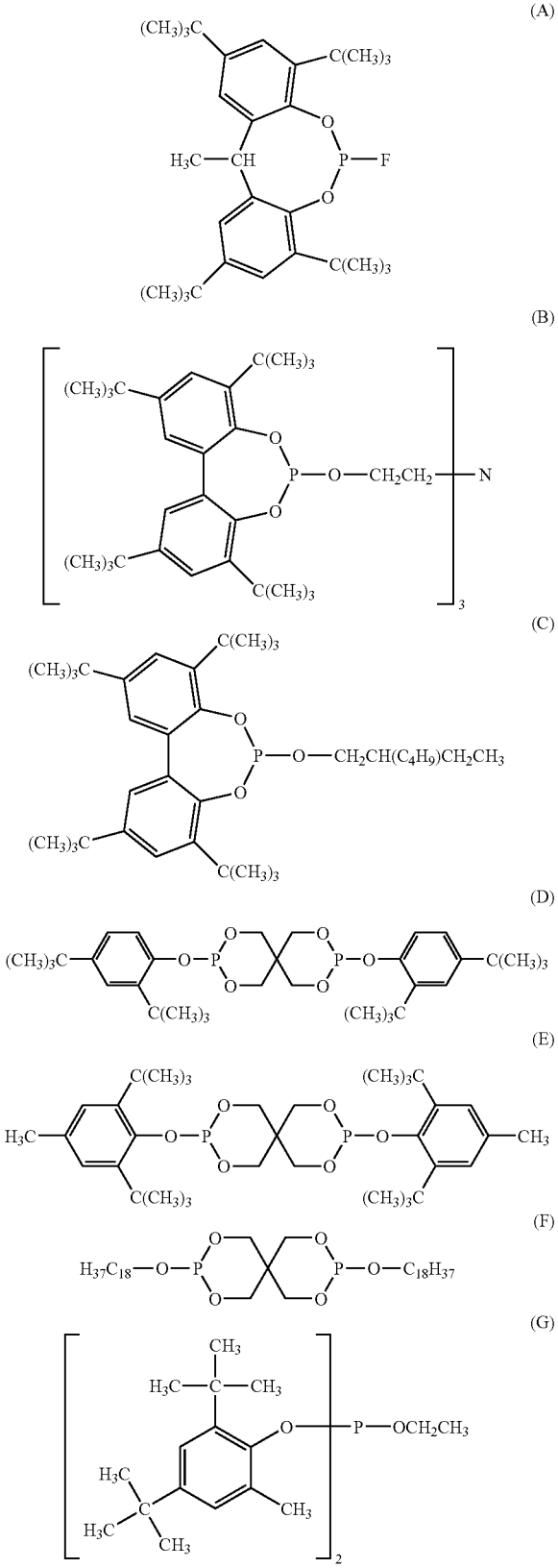

lamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenylnitrone, N-ethyl-alpha-methyinitrone, N-octyl-alpha-heptylnitrone, N-lauryl-alpha-undecylnitrone, N-tetradecyl-alpha-tridecylnitrone, N-hexadecyl-alpha-pentadecyinitrone, N-octadecyl-alpha-heptadecyinitrone, N-hexadecyl-alpha-heptadecyinitrone, N-ocatadecyl-alpha-pentadecyinitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyidithiocarbamate, dioctadecyl disulfide, pentaerythritol tetrakis(β-dodecylmercapto)propionate.

9. Polyamide stabilisers, for example copper salts in combination with iodides and/or phosphorus compounds and salts of divalent manganese.

10. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Conventional nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

12. Other additives, for example plasticisers, lubricants, rheology additives, catalysts, flow-control agents, optical brighteners, flameproofing agents, antistatic agents and blowing agents.

13. Benzofuranones and Indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839 or EP-A-0591102 or 3-[4-(2-acetoxyethoxy)phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-(2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.

The weight ratio of the β-nucleating agent(s) (component (2)) to the conventional additive is for example 1:1000 to 100:1, preferably 1:100 to 100:1, 1:90 to 90:1, 1:80 to 80:1, 1:70 to 70:1, 1:60 to 60:1, 1:50 to 50:1, 1:40 to 40:1, 1:30 to 5. Hydroxylamines, for example N,N-dibenzylhydroxylamine, N,N-diethylhydroxylamine, N,N-dioctylhydroxy- 30:1, 1:20 to 20:1, 1:10 to 10:1, 1:5 to 5:1, 1:4 to 4:1, 1:3 to 3:1, 1:2 to 2:1 or 1:1. In general, the conventional additive is present in the composition of this invention in an amount of preferably 0.0001 to 5% or 0.001 to 3%, in particular 0.01 to 2% or 0.01 to 0.25%, relative to the weight of component (1).

The polypropylene resin of component (I) preferably contains one or more process stabilizers, e.g. in an amount of 0.001 to 2%, relative to the weight of component (1).

Examples of processing of the resin compositions according to the present invention are: Injection blow molding, extrusion, blow molding, rotomolding, in mold decoration (back injection), slush molding, injection molding, co-injection molding, forming, compression molding, pressing, film extrusion (cast film; blown film), fiber spinning (woven, non-woven), drawing (uniaxial, biaxial), annealing, deep drawing, calandering, mechanical transformation, sintering, coextrusion, coating, lamination, crosslinking (radiation, peroxide, silane), vapor deposition, weld together, glue, vulkanization, thermoforming, pipe extrusion, profile extrusion, sheet extrusion; sheet casting, spin coating, strapping, foaming, recycling/rework, extrusion coating, visbreaking (peroxide, thermal), fiber melt blown, spun bonded, surface treatment (corona discharge, flame, plasma), sterilization (by gamma rays, electron beams), gel-coating, tape extrusion, SMC-process or plastisol.

The resulting crystalline polypropylene resin composition of the present invention are preferably molded by injection, compression, blow molding, roto molding and/or other known molding techniques utilizing the conventional molding machines. Molding conditions may be those commonly employed. Typical preferred molding conditions may be as follows. Injection molding: resin temperature about 180 to 320° C., preferably about 200 to 300° C.; mold temperature about 0 to 120° C., preferably about 30 to 80° C. Blow molding: resin temperature about 180 to 300° C., preferably about 200 to 280° C.; mold temperature about 20 to 140° C., preferably about 60 to 120° C. Compression molding: temperature of melted resin about 180 to 300° C., preferably about 200 to 280° C.; cooling temperature about 10 to 125° C., preferably about 30 to 100° C.

Molded products, which contain much higher proportion of β-crystal form than the reference material and which are satisfactory in the aspect of color, can be easily obtained by molding under the above-mentioned molding condition the resin composition of the invention prepared with use of, for instance, the above-mentioned mixing method. Compared with the conventional polypropylene pellet which normally does not substantially contain β-crystals but is predominantly composed of α-crystals, the polypropylene molded product has a lower melting point and requires a lower force for deformation under heating. Therefore, the molded products contribute a great deal to improved secondary processability and mechanical characteristics. The products encompass a wide variety of forms such as packaging, containers, bumpers, housing, technical article (e.g. gear) and so on.

With the resin compositions of the present invention, the ratio of α- to β-form in the final product can be controlled as desired by suitable solidification conditions. It is possible to control the ratio of α- to β-form by appropriately selecting cooling conditions under the above molding condition. This characteristic is beneficial particularly in the surface roughening of, for instance, biaxially oriented films and fibres. The film having such a roughened surface displays excellent anti-blocking property, printability and adhesion, etc. and is of great use in the fields of packaging film, printing paper, tracing paper, oil-immersion type plastic capacitors and so on.

The resin compositions according to the present invention can be advantageously used for the preparation of various shaped articles. Examples are:

I-1) Floating devices, marine applications, pontoons, buoys, plastic lumber for decks, piers, boats, kayaks, oars, and beach reinforcements.

I-2) Automotive applications, in particular bumpers, dashboards, battery, rear and front linings, moldings parts under the hood, hat shelf, trunk linings, interior linings, air bag covers, electronic moldings for fittings (lights), panes for dashboards, headlamp glass, instrument panel, exterior linings, upholstery, automotive lights, head lights, parking lights, rear lights, stop lights, interior and exterior trims; door panels; gas tank; glazing front side; rear windows; seat backing, exterior panels, wire insulation, profile extrusion for sealing, cladding, pillar covers, chassis parts, exhaust systems, fuel filter/filler, fuel pumps, fuel tank, body side mouldings, convertible tops, exterior mirrors, exterior trim, fasteners/fixings, front end module, glass, hinges, lock systems, luggage/roof racks, pressed/stamped parts, seals, side impact protection, sound deadener/insulator and sunroof.

I-3) Road traffic devices, in particular sign postings, posts for road marking, car accessories, warning triangles, medical cases, helmets, tires.

I-4) Devices for plane, railway, motor car (car, motorbike) including furnishings.

I-5) Devices for space applications, in particular rockets and satellites, e.g. reentry shields.

I-6) Devices for architecture and design, mining applications, acoustic quietized systems, street refuges, and shelters.

II-1) Appliances, cases and coverings in general and electric/electronic devices (personal computer, telephone, portable phone, printer, television-sets, audio and video devices), flower pots, satellite TV bowl, and panel devices.

II-2) Jacketing for other materials such as steel or textiles.

II-3) Devices for the electronic industry, in particular insulation for plugs, especially computer plugs, cases for electric and electronic parts, printed boards, and materials for electronic data storage such as chips, check cards or credit cards.

II-4) Electric appliances, in particular washing machines, tumblers, ovens (microwave oven), dish-washers, mixers, and irons.

II-5) Covers for lights (e.g. street-lights, lamp-shades).

II-6) Applications in wire and cable (semi-conductor, insulation and cable-jacketing).

II-7) Foils for condensers, refrigerators, heating devices, air conditioners, encapsulating of electronics, semi-conductors, coffee machines, and vacuum cleaners.

III-1) Technical articles such as cogwheel (gear), slide fittings, spacers, screws, bolts, handles, and knobs.

III-2) Rotor blades, ventilators and windmill vanes, solar devices, swimming pools, swimming pool covers, pool liners, pond liners, closets, wardrobes, dividing walls, slat walls, folding walls, roofs, shutters (e.g. roller shutters), fittings, connections between pipes, sleeves, and conveyor belts.

III-3) Sanitary articles, in particular shower cubicles, lavatory seats, covers, and sinks.

III-4) Hygienic articles, in particular diapers (babies, adult incontinence), feminine hygiene articles, shower curtains, brushes, mats, tubs, mobile toilets, tooth brushes, and bed pans.

III-5) Pipes (cross-linked or not) for water, waste water and chemicals, pipes for wire and cable protection, pipes for gas, oil and sewage, guttering, down pipes, and drainage systems.

III-6) Profiles of any geometry (window panes) and siding.

III-7) Glass substitutes, in particular extruded plates, glazing for buildings (monolithic, twin or multiwall), aircraft, schools, extruded sheets, window film for architectural glazing, train, transportation, sanitary articles, and greenhouse.

III-8) Plates (walls, cutting board), extrusion-coating (photographic paper, tetrapack and pipe coating), silos, wood substitute, plastic lumber, wood composites, walls, surfaces, furniture, decorative foil, floor coverings (interior and exterior applications), flooring, duck boards, and tiles.

III-9) Intake and outlet manifolds.

III-10) Cement-, concrete-, composite-applications and covers, siding and cladding, hand rails, banisters, kitchen work tops, roofing, roofing sheets, tiles, and tarpaulins.

IV-1) Plates (walls and cutting board), trays, artificial grass, astroturf, artificial covering for stadium rings (athletics), artificial floor for stadium rings (athletics), and tapes.

IV-2) Woven fabrics continuous and staple, fibers (carpets/hygienic articles/geotextiles/monofilaments; filters; wipes/curtains (shades)/medical applications); bulk fibers (applications such as gown/protection clothes), nets, ropes, cables, strings, cords, threads, safety seat-belts, clothes, underwear, gloves; boots; rubber boots, intimate apparel, garments, swimwear, sportswear, umbrellas (parasol, sunshade), parachutes, paraglides, sails, "balloon-silk", camping articles, tents, airbeds, sun beds, bulk bags, and bags.

IV-3) Membranes, insulation, covers and seals for roofs, tunnels, dumps, ponds, dumps, walls roofing membranes, geomembranes, swimming pools, curtains (shades)/sunshields, awnings, canopies, wallpaper, food packing and wrapping (flexible and solid), medical packaging (flexible & solid), airbags/safety belts, arm- and head rests, carpets, centre console, dashboard, cockpits, door, overhead console module, door trim, headliners, interior lighting, interior mirrors, parcel shelf, rear luggage cover, seats, steering column, steering wheel, textiles, and trunk trim.

V) Films (packaging, dump, laminating, agriculture and horticulture, greenhouse, mulch, tunnel, silage), bale wrap, swimming pools, waste bags, wallpaper, stretch film, raffia, desalination film, batteries, and connectors.

VI-1) Food packing and wrapping (flexible and solid), BOPP, BOPET, bottles.

VI-2) Storage systems such as boxes (crates), luggage, chest, household boxes, pallets, shelves, tracks, screw boxes, packs, and cans.

VI-3) Cartridges, syringes, medical applications, containers for any transportation, waste baskets and waste bins, waste bags, bins, dust bins, bin liners, wheely bins, container in general, tanks for water/used water/chemistry/gas/oil/gasoline/diesel; tank liners, boxes, crates, battery cases, troughs, medical devices such as piston, ophthalmic applications, diagnostic devices, and packing for pharmaceuticals blister.

VII-1) Extrusion coating (photo paper, tetrapack, pipe coating), household articles of any kind (e.g. appliances, thermos bottle/clothes hanger), fastening systems such as plugs, wire and cable clamps, zippers, closures, locks, and snap-closures.

VII-2) Support devices, articles for the leisure time such as sports and fitness devices, gymnastics mats, ski-boots, inline-skates, skis, big foot, athletic surfaces (e.g. tennis grounds); screw tops, tops and stoppers for bottles, and cans.

VII-3) Furniture in general, foamed articles (cushions, impact absorbers), foams, sponges, dish clothes, mats, garden chairs, stadium seats, tables, couches, toys, building kits (boards/figures/balls), playhouses, slides, and play vehicles.

VII-4) Materials for optical and magnetic data storage.

VII-5) Kitchen ware (eating, drinking, cooking, storing).

VII-6) Boxes for CD's, cassettes and video tapes; DVD electronic articles, office supplies of any kind (ball-point pens, stamps and ink-pads, mouse, shelves, tracks), bottles of any volume and content (drinks, detergents, cosmetics including perfumes), and adhesive tapes.

VII-7) Footwear (shoes/shoe-soles), insoles, spats, adhesives, structural adhesives, food boxes (fruit, vegetables, meat, fish), synthetic paper, labels for bottles, couches, artificial joints (human), printing plates (flexographic), printed circuit boards, and display technologies.

VII-8) Devices of filled polymers (talc, chalk, china clay (kaolin), wollastonite, pigments, carbon black, $TiO_2$, mica, nanocomposites, dolomite, silicates, glass, asbestos).

Thus, a further embodiment of the present invention relates to a shaped article, in particular a film fiber, profile, pipe, bottle, tank or container, containing a resin composition as described above.

A molded article is preferred. The molding is in particular effected by injection, blow, compression, roto-molding or slush-molding or extrusion.

A further embodiment of the present invention relates to a monoaxially-oriented film or a biaxially-oriented film which has been formed by stretching a film containing a composition as described above.

Another embodiment of the present invention is a fiber which has been formed by stretching a fiber containing a composition as described above.

The present invention further relates to a multilayer system in which one or more layers contain a composition as described above.

The compounds of the formula (I) can be prepared in analogy to known processes, for example by reacting an appropriate amine with 1,3,5-benzenetricarboxylic acid trichloride as described for example in the standard works such as Houben-Weyl, Methoden der Organischen Chemie [Methods of Organic Chemistry], published by Georg Thieme, Stuttgart), under reaction conditions which are known. In carrying out these reactions, it is also possible to take advantage of variants known per se which are not specifically mentioned here. The starting substances can, if so desired also be formed in situ, by not isolating them out of the reaction mixture but immediately reacting them further to the compounds of the formula (I). Working Examples A to C describe a representative method of the preparation.

Examples of appropriate amines are:
isopropylamine,
n-butylamine,
sec-butylamine
tert-butylamine,
n-pentylamine,
1,1-dimethylpropylamine,
1,2-dimethylpropylamine,
3-methylbutylamine,
n-hexylamine,
n-heptylamine,
n-octylamine,
2-ethylhexylamine,
tert-octylamine (1,1,3,3-tetramethylbutylamine),
isononylamine,
n-dodecylamine,
tridecylamine,
tallowamine,
2-dimethylaminoethylamine, 2-diethylaminoethylamine,
3-dimethylaminopropylamine,
3-diethylaminopropylamine,
3-methylaminopropylamine,
2-methoxyethylamine,
2-ethoxyethylamine,
2-methoxypropylamine,
2-ethoxypropylamine,
3-isopropoxypropylamine,
allylamine,
oleylamine,
cyclopentylamine,
cyclohexylamine,
2-methylcyclohexylamine,
cyclohexylmethylamine,
4-methylphenylamine (=4-methylaniline),
2-ethylphenylamine (=2-ethylaniline),
4-ethylphenylamine (=4-ethylaniline),
4-isopropylphenylamine (=4-isopropylaniline),
4-tert-butylphenylamine (=4-tert-butylaniline),
4-sec-butylphenylamine (=4-sec-butylaniline),
4-isobutylphenylamine (=4-isobutylaniline),
3,5-dimethylphenylamine (=3,5-dimethylaniline),
3,4-dimethylphenylamine (=3,4-dimethylaniline),
2,4-dimethylphenylamine (=2,4-dimethylaniline),
2,6-diethylphenylamine (=2,6-diethylaniline),
2-ethyl-6-methylphenylamine (=2-ethyl-6-methylaniline),
2,6-diisopropylphenylamine (=2,6-diisopropylaniline),
4-methoxyphenylamine (=4-methoxyaniline),
4-ethoxyphenylamine (=4-ethoxyaniline),
4-hydroxyphenylamine (=4-hydroxyaniline),
4-acetamidophenylamine (=4-acetamidoaniline),
3-chlorophenylamine (=3-chloroaniline),
2-chlorophenylamine (=2-chloroaniline),
3-chloro-6-methylphenylamine,
2-benzoylphenylamine (=2-benzoylaniline),
4-phenylaminophenylamine,
4-(phenylazo)phenylamine (=4-aminoazobenzene),
benzylamine,
2-phenylethylamine,
1-naphthylamine,
adamantylamine,
2-picolylamine,
(2-furyl)methylamine,
(2-tetrahydrofuryl)methylamine,
2-pyrimidylamine,
6-methyl-2-pyridylamine,
1,2,4-triazol-3-ylamine, and
2-(1-piperazinyl)ethylamine.

The following examples describe the present invention in greater detail.

Unless indicated otherwise, heretofore and hereinafter, all parts and percentages are by weight and all temperatures are given in degrees Celsius (° C.). "Customary working up" means: addition to water, filtration of precipitate, extracting with organic solvent and/or purifying the product by crystallization and/or chromatography and/or sublimation.

EXAMPLE A

Preparation of the Compound of the Formula

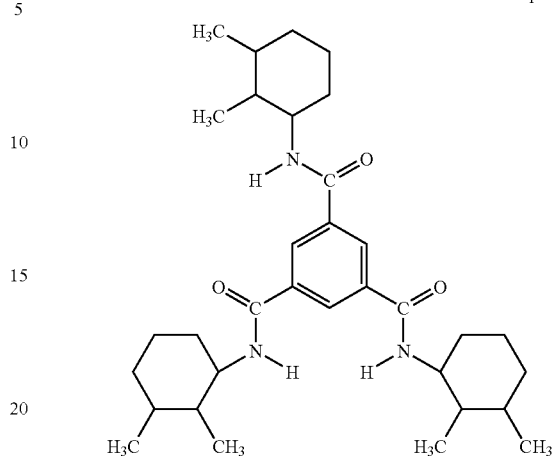

Compound A-10

4.20 g (33 mmol) of 2,3-dimethylcyclohexylamine (isomeric mixture) and 0.1 g of dry LiCl are added under inert atmosphere to 70 ml of dry N-methylpyrrolidinone (NMP) and 15 ml of dry pyridine and cooled to 5° C. Then, 2.39 g (9 mmol) of 1,3,5-benzenetricarboxylic acid trichloride are added. The reaction mixture is heated to 75° C. and stirred. After 2 hours the reaction mixture is added to 300 ml of ice water. The precipitate was filtered off. Customary work-up (recrystallization from N,N-dimethylformamide) gives 1,3,5-benzenetricarboxylic acid tris(2,3-dimethylcyclohexylamide).

Yield: 3.28 g (6.10 mmol)=67.8% of theory.

Melting point: 418° C. (under simultaneous evaporation).

$^1$H-NMR (CF$_3$COOD/CDCl$_3$ 1:1): δ=0.50-2.35 (m, 42H); 3.58-4.55 (m, 3H); 8.50-8.88 (m, 3H).

$^{13}$C-NMR (CF$_3$COOD/CDCl$_3$ 1:1): δ=5.0-58.0 (aliphatic carbon atoms) 130.8; 134.3; 168.5.

IR (KBr, cm$^{-1}$): 3232; 3065; 2928; 1637; 1550; 1290.

MS (70 eV), m/z: 537 (M$^+$, 5%).

EXAMPLE B

Preparation of the Compound of the Formula

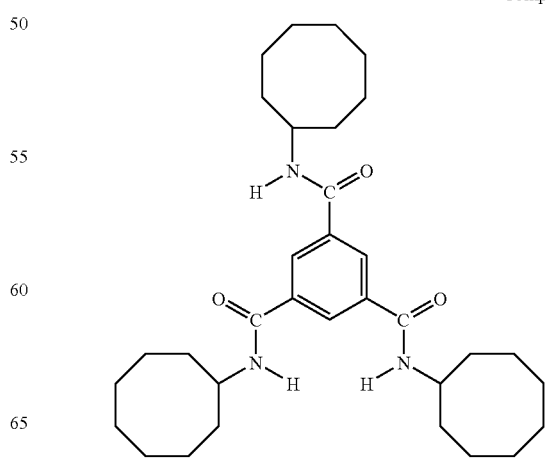

Compound A-9

4.20 g (33 mmol) of cyclooctylamine and 0.1 g of dry LiCl are added under inert atmosphere to 70 ml of dry NMP and 15 ml of dry pyridine and cooled to 5° C. Then, 2.39 g (9 mmol) of 1,3,5-benzenetricarboxylic acid trichloride are added. The reaction mixture is heated to 75° C. and stirred. After 2 hours the reaction mixture is added to 300 ml of ice water. Customary work-up (recrystallization from N,N-dimethylformamide) gives 1,3,5-benzenetricarboxylic acid tris(cyclooctylamide).

Yield: 4.02 g (7.48 mmol)=83.1% of theory.
Melting point: 402° C. (under simultaneous evaporation).
$^1$H-NMR (CF$_3$COOD/CDCl$_1$ 1:1): δ=1.46-2.07 (m, 42H); 4.15-4.36 (m, 3H); 8.66 (s, 3H).
$^{13}$C-NMR (CF$_3$COOD/CDCl$_3$ 1:1): δ=23.7; 25.5; 27.0; 31.9; 53.2; 130.9; 134.3; 167.9.
IR (KBr, cm$^{-1}$): 3222; 3059; 2922; 1634; 1556; 1285.
MS (70 eV). m/z: 537 (M$^+$, 42%).

EXAMPLE C

Preparation of the Compound of the Formula

Compound A-6

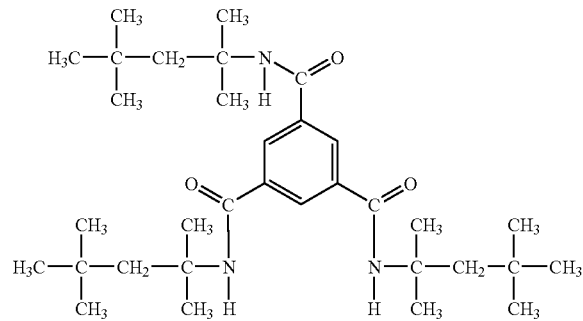

4.26 g (33 mmol) of 1,1,3,3-tetramethylbutylamine (tert-octylamine) and 0.1 g of dry LiCl are added under inert atmosphere to 70 ml of dry NMP and 15 ml of dry pyridine and cooled to 5° C. Then, 2.39 g (9 mmol) of 1,3,5-benzenetricarboxylic acid trichloride are added. The reaction mixture is heated to 75° C. and stirred. After 2 hours the reaction mixture is added to 300 ml of ice water. The precipitate is filtered off. Customary work-up (recrystallization from methanol) gives 1,3,5-benzenetricarboxylic acid tris(1,1,3,3-tetramethylbutylamide).

Yield: 3.40 g (6.25 mmol)=69.5% of theory.
Melting point: 315° C. (under simultaneous evaporation).
$^1$H-NMR (CF$_3$COOD/CDCl$_3$ 1:1): δ=1.03 (s, 27H); 1.58 (s, 18H); 1.95 (s, 6H); 8.49 (s, 3H).
$^{13}$C-NMR (CF$_3$COOD/CDCl$_3$ 1:1): δ=28.8; 31.0; 31.8; 51.1; 58.8; 130.3; 135.4; 168.6.
IR (KBr, cm$^{-1}$): 3237; 3063; 2955; 1637; 1557; 1228.
MS (70 eV), m/z: 543 (M$^+$, 46%).

The following compounds A-1 to A-5, A-7 and A-8 which are characterized by their melting points (m.p.) are analogously prepared. The melting point is determined in a DSC-instrument at a heating rate of 10 K/min.

Preferred Examples of compounds of the formula (I) are:
Compound A-1: 1,3,5-benzenetricarboxylic acid tris(benzylamide); m.p.=243° C.
Compound A-2: 1,3,5-benzenetricarboxylic acid tris(cycloheptylamide); m.p.=394° C.*)
Compound A-3: 1,3,5-benzenetricarboxylic acid tris(3-methylcyclohexylamide); m.p.=381° C.*)
Compound A-4: 1,3,5-benzenetricarboxylic acid tris(3,4-dimethylphenylamide); m.p.=340° C.**)
Compound A-5: 1,3,5-benzenetricarboxylic acid tris(cyclododecylamide); m.p.=393° C.*)
Compound A-6: 1,3,5-benzenetricarboxylic acid tris(tert-octylamide); m.p.=315° C.*)
Compound A-7: 1,3,5-benzenetricarboxylic acid tris(S(+)-1-cyclohexylethylamide); m.p.=397° C.*)
Compound A-8: 1,3,5-benzenetricarboxylic acid tris(R(−)-1-cyclohexylethylamide); m.p.=392° C.*)
Compound A-9: 1,3,5-benzenetricarboxylic acid tris(cyclooctylamide); m.p. =402° C.*)
Compound A-10: 1,3,5-benzenetricarboxylic acid tris(2,3-dimethylcyclohexylamide); m.p.=418° C.*)
Compound A-11: 1,3,5-benzenetricarboxylic acid tris(n-butylamide); m.p.=239° C.

*) Melting under simultaneous evaporation.

**) Melting under decomposition.

The general procedures used in Working Example I are described below.

Mixing Procedure:

To 59.91 g of powdered polypropylene (ELF-Atochem (RTM); Appryl 3030BN1 (RTM)) 90 mg of a powdered additive (0.15% by weight) or a powdered mixture of additives (total 0.15% by weight) is added, and tumble-mixed for 24 h in a glass container. In general, 4.5 g of this mixture are compounded at 239° C. in a small-scale, laboratory twin-screw, recirculating and corotating extruder, for example the MicroCompounder of DACA Instruments (RTM), for a period of about 4 min at a screw speed of 40 rpm, and subsequently collected at room temperature. The neat polypropylene is similarly treated to produce a blank control sample.

Differential Scanning Calorimetry (DSC):

A Perkin-Elmer DSC instrument (RTM) (Model DSC 7), operated in a dry nitrogen atmosphere, is used for the analysis of the crystallization behavior of the various mixtures and control samples, according to standard procedures. About 5 to 10 mg of sample is sealed into an aluminum cup, heated from 130° C. to 230° C. at a rate of 10° C./min, held at 230° C. for 5 min, and then subsequently cooled at a rate of 10° C./min to 50° C. The data represented as crystallization temperatures are the peak temperatures of the exotherms (predominant peak minimum) in the thermograms that are recorded upon cooling.

Injection Molding:

The injection molding is performed with a MicroInjector (DACA Instruments (RTM)). About 3.0 g of the pelletized thread is placed under a nitrogen blanket in the barrel at 260° C. After the granulate is completely molten, the melt is injected into a polished mold with a pressure of about 8 bar. The mold temperature is 20° C. The collected test specimen has a diameter of 2.5 cm and a thickness of about 1.1-1.2 mm.

Optical Characterization (Transmission, Clarity, Haze):

Transmission, clarity and haze are measured with a haze-gard plus instrument (BYK, Gardner (RTM), illumination CIE-C) at room temperature. The haze-gard plus instrument conforms to ASTM D-1003. The transmission, clarity and haze values are measured between 12-24 hours after obtaining the samples by injection molding.

Determination of the β-form Crystal Content by Wide Angle X-ray Scattering (WAXS)

A Bruker (RTM) wide angle X-ray diffractometer (Model D8 Advance) is used for the analysis of the β-modification content of the injection molded specimen prepared as described above.

The test specimen is placed in a sample holder in the middle between the copper $K_\alpha$ radiation source ($\gamma=1.54178$ Å) and the detector. The sample is placed in a position so that the machine direction (MD) is parallel to the slit-shaped beam. This position is used for the determination of the β-form crystal content. The diffraction pattern is recorded from $2\Theta=8-30°$. The β-form crystal content is determined as described by A. Turner Jones et al., Makromol. Chem. 75, 134 (1964) and in U.S. Pat. No. 5,491,188 according to the following equation:

$$\beta\text{-form crystal content (\%)}=100\times P_{62\ 1}/(P_{\alpha 1}+P_{\alpha 2}+P_{\alpha 3}+P_{\beta 1})$$

where $P_{\alpha 1}$ to $P_{\alpha 3}$ means the maximum peak heights of the α-form and $P_{\beta 1}$ means the maximum peak height of the β-form determined by wide angle X-ray scattering.

$P_{\beta 1}$ is a reflection intensity (height) on (300) plane of β-form crystal.

$P_{\beta 1}$ is a reflection intensity (height) on (110) plane of α-form crystal.

$P_{\alpha 2}$ is a reflection intensity (height) on (040) plane of α-form crystal.

$P_{\alpha 3}$ is a reflection intensity (height) on (130) plane of α-form crystal.

EXAMPLE I 0.15 wt % of the compound indicated in Table 1 are added to the polypropylene resin, processed and characterized according to the above methods.

The transmission, haze, clarity, recrystallization temperature and the β-form crystal content of the polypropylene composition according to the present invention are listed in Table 1 as well as the thickness of the test specimen (plate).

droxyphenyl)propionate, 0.10% of calcium stearate and 0.20% of Compound A-10. This blend is then extruded in a twin-screw extruder of Berstorif (RTM) at a temperature of at most 240° C. After drawing the extrudate through a waterbath to cool, it is granulated.

Injection Molding (Example IIa):

90 mm×85 mm×2 mm test panels are moulded from these granules by means of an injection-moulding machine (Arburg 320 S (RTM)) at a temperature of at most 240° C. (mold temperature 50° C.).

Compression Molding (Examples IIb to IIf):

140 mm×240 mm×2 mm thick test panels are compression molded from these granules.

EXAMPLE IIb 55 g of the granules are molten at $T_1=240°$ C. for 15 min in a melt press Suter LP 322 (RTM). Subsequently, the molten polypropylene resin composition is put in a second melt press (Suter LP 322 (RTM)) which has a temperature of $T_2=60°$ C. The samples are pressed at p=10 bar and are annealed/crystallized for 5 min.

EXAMPLE IIc 55 g of the granules are molten at $T_1=240°$ C. for 15 min in a melt press Suter LP 322 (RTM). Subsequently, the molten polypropylene resin composition is put in a second melt press (Suter LP 322 (RTM)) which has a temperature of $T_2=80°$ C. The samples are pressed at p=10 bar and are annealed/crystallized for 10 min.

EXAMPLE IId 55 g of the granules were molten at $T_1=240°$ C. for 15 min in a melt press Suter LP 322 (RTM). Subsequently, the molten polypropylene resin composition is put in a second melt press (Suter LP 322 (RTM)) which has a temperature of $T_2=100°$ C. The samples are pressed at p=10 bar and are annealed/crystallized for 30 min.

TABLE 1

The recrystallization temperature ($T_{cr}$) of the polypropylene resin without β-nucleating agent: 112.0° C.

| β-nucleating agent | Transmission in % | Haze in % | Clarity in % | [1)]T* in ° C. | β-form crystal content in % | Thickness of the plate in mm |
|---|---|---|---|---|---|---|
| A-1 | 85.7 | 75.2 | 87.6 | 120.0 | 15 | 1.12 |
| A-2 | 86.7 | 71.7 | 91.2 | 123.3 | 29 | 1.11 |
| A-3 | 88.3 | 96.1 | 84.0 | 120.5 | 37 | 1.12 |
| A-4 | 83.0 | 92.8 | 90.3 | 116.1 | 38 | 1.12 |
| A-5 | 88.1 | 87.0 | 91.7 | 122.1 | 38 | 1.11 |
| A-6 | 88.8 | 35.8 | 98.9 | 124.3 | 40 | 1.11 |
| A-7 | 87.5 | 90.2 | 90.4 | 125.7 | 45 | 1.15 |
| A-8 | 88.5 | 72.7 | 98.0 | 124.8 | 59 | 1.16 |
| A-9 | 82.4 | 97.6 | 83.3 | 124.3 | 64 | 1.13 |
| A-10 | 86.2 | 98.2 | 72.3 | 121.6 | 74 | 1.13 |

[1)]T*: Recrystallization temperature of the polypropylene resin containing the β-nucleating agent.

EXAMPLE II 2.5 kg of polypropylene powder (Moplen FL F 20 (RTM) of Montell (RTM)) are mixed to homogeneity in a high-speed mixer with 0.10% of tris(2,4-di-tert-butylphenyl)phosphite, 0.05% of pentaerythritol tetrakis 3-(3,5-di-tert-butyl-4-hy-

EXAMPLE IIe 55 g of the granules are molten at $T_1=240°$ C. for 15 min in a melt press Suter LP 322 (RTM). Subsequently, the molten polypropylene resin composition is put in a second melt press (Suter LP 322 (RTM)) which has a temperature of $T_2=110°$ C. The samples are pressed at p=10 bar and are annealed/crystallized for 60 min.

EXAMPLE IIf 55 g of the granules are molten at $T_1=240°$ C. for 15 min in a melt press Suter LP 322 (RTM). Subsequently, the molten polypropylene resin composition is put in a second melt press (Suter LP 322 (RTM)) which has a temperature of $T_2=120°$ C. The samples are pressed at p=10 bar and are annealed/crystallized for 120 min.

The β-form crystal content of the samples is determined by Wide Angle X-ray Scattering (WAXS) and the recrystallization temperature is determined by Differential Scanning Calorimetry (DSC) as described below. The results are listed in Table 2.

WAXS:

A Siemens (RTM) wide angle X-ray diffractometer (Model D500) is used for the analysis of the β-modification content of the specimen prepared as described above. The test specimen is placed in a sample holder in the middle between the copper $K_\alpha$ radiation source (γ=1.54178 Å) and the detector. The sample is rotated during the recording at 2 rpm. The diffraction pattern is recorded from 2Θ=5-35° at an increment of 0.0250 and a recording time of 1 sec. The β-form crystal content is determined as described under Example I.

DSC:

A TA Instruments (RTM) DSC apparatus (Model DSC 2920 Modulated DSC), operated in a dry nitrogen atmosphere, is used for the analysis of the crystallization behavior of the various mixtures and control samples, according to standard procedures. About 5 to 10 mg of sample is sealed into an aluminum cup, heated from ambient temperature to 240° C. at a rate of 10 K/min, held at 240° C. for 5 min, and then subsequently cooled at a rate of 10 K/min to ambient temperature. The data represented as crystallization temperatures are the peak temperatures of the exotherms (predominant peak minimum) in the thermograms that are recorded upon cooling.

TABLE 2

Recrystallization temperature ($T_{cr}$) of the polypropylene resin (component (1)) without β-nucleating agent: 109.0° C.
Recrystallization temperature (T*) of the polypropylene resin containing 0.20% by weight of Compound A-10: 124.1° C.

| Example | β-nucleating agent | $T_s$ in ° C. | β-form crystal content in % |
|---|---|---|---|
| II-a | A-10 | 50 | 58 |
| II-b | A-10 | 60 | 68 |
| II-c | A-10 | 80 | 66 |
| II-d | A-10 | 100 | 47 |
| II-e | A-10 | 110 | 44 |
| II-f | A-10 | 120 | 33 |

EXAMPLE III

Compounding:

5 kg of polypropylene homopolymer (Moplen (RTM) PH 350 (RTM) of Montell (RTM)) powder are mixed to homogeneity in a high-speed mixer with 0.10% of tris(2,4-di-tert-butylphenyl)phosphite, 0.05% of pentaerythritol tetrakis 3-(3,5-di-tert-butyl-4-hydroxyphenyl)propionate, 0.10% of calcium stearate and different amounts of Compound A-10 (0.025, 0.05 or 0.1% by weight, relative to the weight of the polypropylene homopolymer powder). This blend is then extruded in a twin-screw extruder of Berstorff (RTM) (screw diameter 25 mm, L/D ratio: 46) at a temperature of at most 230° C. After drawing the extrudate through a water bath to cool, it is granulated.

Cast Film Preparation:

Cast films are produced by using a single screw extruder (Dr. Collin, E 30M) equipped with a cast film line (Dr. Collin CR136/350) at temperatures of 230° C. (extruder) and 115° C. (chill roll). Cast films are produced at a thickness of 0.2 mm and 1 mm.

Production of Biaxial Oriented Films:

Test sample preparation: Test samples are cut into 85 mm×85 mm pieces from the cast film. Stretching is performed in a biaxial stretching machine of Bruckner Karo IV at a Hencky strain of 0.1 s$^{-1}$.
Initial size L0 (mm): MD×TD=70×70 (clip distance 70 mm)
Preheating time: 40 sec /150° C.
Set clip temperature: 95° C.

The invention claimed is:
1. A composition containing
(1) a crystalline polypropylene resin and
(2) one or more β-nucleating agents of the formula (I),

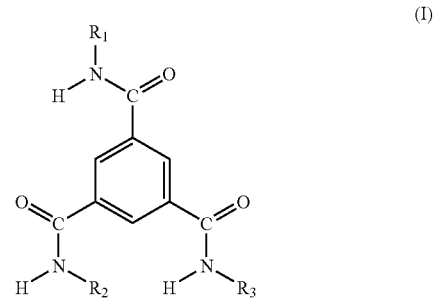

wherein
$R_1$, $R_2$ and $R_3$, independently of one another, are
$C_1$-$C_{20}$alkyl,
$C_2$-$C_{20}$alkyl substituted by $C_1$-$C_{10}$alkylamino, di($C_1$-$C_{10}$alkyl)amino, $C_1$-$C_{10}$alkyloxy or hydroxy;
$C_3$-$C_{20}$alkenyl,
$C_5$-$C_{12}$cycloalkyl,
$C_5$-$C_{12}$cycloalkyl substituted by 1, 2 or 3 $C_1$-$C_{10}$alkyl;
cyclohexylmethyl;
cyclohexylmethyl substituted by 1, 2 or 3 $C_1$-$C_{10}$alkyl;
$C_5$-$C_9$cycloalkenyl,
$C_5$-$C_9$cycloalkenyl substituted by 1, 2 or 3 $C_1$-$C_{10}$alkyl;
phenyl substituted by 1, 2 or 3 radicals selected from the group consisting of $C_1$-$C_{10}$alkyl,
$C_1$-$C_{10}$alkyloxy, hydroxy, halogen, trihalogenmethyl, trihalogenmethoxy, benzoyl, phenylamino,
acylamino and phenylazo;
$C_7$-$C_9$phenylalkyl,
$C_7$-$C_9$phenylalkyl which is substituted on the phenyl by 1, 2 or 3 radicals selected from the group consisting of $C_1$-$C_{10}$alkyl, $C_1$-$C_{10}$alkoxy and hydroxy;
naphthyl,
naphthyl substituted by $C_1$-$C_{10}$alkyl,
adamantyl, or
a 5 to 6 membered heterocyclic group;

characterized in that the polypropylene resin has a content of β-form crystals of at least 10% calculated by means of the following equation $$\text{β-form crystal content (\%)} = 100 \times P_{\beta 1}/(P_{\alpha 1}+P_{\alpha 2}+P_{\alpha 3}+P_{\beta 1})$$

where $P_{\alpha 1}$ to $P_{\alpha 3}$ are respective peak heights (maxima) of the α-form and $P_{\beta 1}$ is a peak height (maximum) of the β-form determined by wide angle X-ray scattering.

2. A composition according to claim 1, wherein the β-form crystals of component (1) are solidified and/or annealed at ambient temperature or at temperatures ($T_S$)

$$T_S \leq T_{cr}+35°\text{ C.}$$

$T_{cr}$ being the recrystallization temperature of the polypropylene resin (component (1)) without a β-nucleating agent as determined by differential scanning calorimetry (DSC) by cooling the molten polypropylene resin at a cooling rate of 10 K/min.

3. A composition according to claim 1 wherein the polypropylene resin of component (1) has a content of β-form crystals of 10 to 98%.

4. A composition according to claim 1 wherein the polypropylene resin of component (1) has a content of β-form crystals of 15 to 80%.

5. A composition according to claim 1, which is further characterized in that the polypropylene resin has a haze which is greater than 62%; the haze value being measured at a plate of 1.1-1.2 mm thickness.

6. A composition according to claim 1 wherein component (1) is a polypropylene homopolymer.

7. A composition according to claim 1 wherein component (1) is a polypropylene random copolymer, alternating or segmented copolymer or block copolymer containing one or more comonomers selected from the group consisting of ethylene, $C_4$-$C_{20}$α-olefin, vinylcyclohexane, vinylcyclohexene, $C_4$-$C_{20}$alkanediene, $C_5$-$C_{12}$cycloalkandiene and norbornene derivatives.

8. A composition according to claim 1 wherein component (1) is a thermoplastic polyolefin (TPO).

9. A composition according to claim 1 which additionally contains (3) a further polymer,
with the proviso that component (3) is different from component (1).

10. A composition according to claim 1 wherein
$R_1$, $R_2$ and $R_3$, independently of one another, are
$C_1$-$C_{20}$alkyl,
$C_2$-$C_{10}$alkyl substituted by $C_1$-$C_4$alkylamino, di($C_1$-$C_4$alkyl)amino, $C_1$-$C_4$alkyloxy or hydroxy;
$C_3$-$C_{20}$alkenyl,
$C_5$-$C_{12}$cycloalkyl,
$C_5$-$C_{12}$cycloalkyl substituted by 1, 2 or 3 $C_1$-$C_4$alkyl;
cyclohexylmethyl;
cyclohexylmethyl substituted by 1, 2 or 3 $C_1$-$C_4$alkyl;
phenyl substituted by 1, 2 or 3 radicals selected from the group consisting of $C_1$-$C_4$alkyl, $C_1$-$C_4$alkyloxy or hydroxy;
benzyl,
benzyl which is substituted on the phenyl by 1, 2 or 3 radicals selected from the group consisting of $C_1$-$C_4$alkyl, $C_1$-$C_4$alkoxy and hydroxy;
naphthyl, or
naphthyl substituted by $C_1$-$C_4$alkyl.

11. A composition according to claim 1, wherein
$R_1$, $R_2$ and $R_3$, independently of one another, are
$C_1$-$C_{20}$alkyl,
$C_2$-$C_6$alkyl substituted by $C_1$-$C_4$alkylamino, di($C_1$-$C_4$alkyl)amino or $C_1$-$C_4$alkyloxy;
$C_5$-$C_{12}$cycloalkyl,
$C_5$-$C_{12}$cycloalkyl substituted by 1, 2 or 3 $C_1$-$C_4$alkyl;
cyclohexylmethyl;
cyclohexylmethyl substituted by 1, 2 or 3 $C_1$-$C_4$alkyl;
phenyl substituted by 1, 2 or 3 $C_1$-$C_4$alkyl;
benzyl,
benzyl which is substituted on the phenyl by 1, 2 or 3 $C_1$-$C_4$alkyl; or
naphthyl.

12. A composition according to claim 1 wherein
$R_1$, $R_2$ and $R_3$, independently of one another, are
butyl, octyl or octadecyl,
3-dimethylaminopropyl, 3-methoxypropyl or 2-methoxyethyl,
cyclohexyl, cycloheptyl, cyclooctyl or cyclododecyl,
3-methylcyclohexyl or 2,3-dimethylcyclohexyl,
1-cyclohexylethyl,
3,4-dimethylphenyl,
benzyl, or
naphthyl.

13. A composition according to claim 1 wherein
$R_1$, $R_2$ and $R_3$ are identical and are 2,3-dimethylcyclohexyl, tert-octyl or cyclooctyl.

14. A composition according to claim 1 wherein
$R_1$, $R_2$ and $R_3$ are identical.

15. A method for providing a polypropylene resin with β-form crystals, which comprises incorporating into the polypropylene resin one or more β-nucleating agents as defined in claim 1.

16. A method for providing a polypropylene resin with a content of β-form crystals of at least 10% calculated by means of the following equation $$\text{β-form crystal content (\%)} = 100 \times P_{\beta 1}/(P_{\alpha 1}+P_{\alpha 2}+P_{\alpha 3}+P_{\beta 1})$$

where $P_{\alpha 1}$ to $P_{\alpha 3}$ are respective peak heights of the α-form (maxima) and $P_{\beta 1}$ is a peak height (maximum) of the β-form determined by wide angle X-ray scattering,
which comprises incorporating into the polypropylene resin one or more β-nucleating agents as defined in claim 1.

17. A shaped article containing a composition according to claim 1.

18. A shaped article according to claim 17, which is a molded article.

19. A shaped article according to claim 18, where the molding is effected by injection, blow, compression, rotomolding or slush-molding or extrusion.

20. A shaped article according to claim 17, which is a film, fiber, profile, pipe, bottle, tank or container.

21. A monoaxially-oriented film or a biaxially-oriented film which has been formed by stretching a film according to claim 20.

22. A fiber which has been formed by stretching a fiber according to claim 20.

23. A multilayer system in which one or more layers contain a composition according to claim 1.

24. A composition according to claim 1 which additionally contains one or more compounds from the group consisting of phenolic antioxidants, phosphites, phosphonites, phosphonates, dialkyl hydroxylamines, nitrones, thiosynergists, benzofuranones, hindered amine light stabilizers and benzotriazole, benzophenones, acrylate, oxamide or triazine UV absorbers.

* * * * *